(12) United States Patent
Ali et al.

(10) Patent No.: US 12,444,300 B2
(45) Date of Patent: Oct. 14, 2025

(54) PREEMPTIVE MANEUVERING SYSTEM FOR VIEWING A TRAFFIC CONTROL DEVICE

(71) Applicant: GM Global Technology Operations LLC, Detroit, MI (US)

(72) Inventors: Kamran Ali, Troy, MI (US); Sayyed Rouhollah Jafari Tafti, Troy, MI (US); Michael Alan Losh, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 245 days.

(21) Appl. No.: 18/184,374

(22) Filed: Mar. 15, 2023

(65) Prior Publication Data
US 2024/0312343 A1 Sep. 19, 2024

(51) Int. Cl.
*G08G 1/0967* (2006.01)
*B60W 40/04* (2006.01)
*B60W 60/00* (2020.01)
*G08G 1/04* (2006.01)

(52) U.S. Cl.
CPC ....... *G08G 1/096725* (2013.01); *B60W 40/04* (2013.01); *B60W 60/001* (2020.02); *G08G 1/04* (2013.01); *B60W 2420/403* (2013.01); *B60W 2554/4041* (2020.02); *B60W 2554/802* (2020.02); *B60W 2754/30* (2020.02)

(58) Field of Classification Search
None
See application file for complete search history.

(56) References Cited

U.S. PATENT DOCUMENTS

| | | | | |
|---|---|---|---|---|
| 9,666,079 | B2* | 5/2017 | Lokesh | B60W 30/16 |
| 2018/0297598 | A1* | 10/2018 | Yaldo | B60W 30/18154 |
| 2019/0129419 | A1* | 5/2019 | Lee | G05D 1/0263 |
| 2021/0027076 | A1* | 1/2021 | Hayashi | G06V 20/584 |
| 2021/0291864 | A1* | 9/2021 | Gadh | B60W 60/0013 |
| 2021/0303882 | A1* | 9/2021 | Mallela | G06V 20/584 |
| 2023/0126540 | A1* | 4/2023 | Wang | B60W 30/18163 701/96 |

* cited by examiner

*Primary Examiner* — Vivek D Koppikar
*Assistant Examiner* — David Ruben Pedersen
(74) *Attorney, Agent, or Firm* — Vivacqua Crane, PLLC

(57) ABSTRACT

A preemptive maneuvering system for viewing a status of a traffic control device by one or more cameras of an autonomous vehicle includes one or more controllers, where a moving obstruction is in front of the autonomous vehicle. The one or more controllers execute instructions to instruct the autonomous vehicle to execute one or more preemptive maneuvers to position the autonomous vehicle at the target following distance from the moving obstruction along the roadway.

18 Claims, 6 Drawing Sheets

PREEMPTIVE MANEUVERING SYSTEM FOR VIEWING A TRAFFIC CONTROL DEVICE

INTRODUCTION

The present disclosure relates to a preemptive maneuvering system for positioning an autonomous vehicle in a location to view a status of a traffic control device by one or more cameras that are part of the autonomous vehicle. A moving obstruction is in front of the autonomous vehicle and may occlude a line-of-sight between the cameras and the traffic control device.

An autonomous vehicle executes various tasks such as, but not limited to, perception, localization, mapping, path planning, decision making, and motion control. An autonomous vehicle may perceive objects in the surrounding environment by various perception sensors. Some examples of perception sensors include visual sensors such as a camera and depth sensors such as LiDAR. A camera captures image data representative of the surrounding environment, where various computer vision and machine learning algorithms analyze the image data captured by the camera to determine information regarding the autonomous vehicle's surroundings. For example, the camera may capture image data representative of a traffic control device, such as a traffic light signal. The autonomous driving system may determine the status of the traffic light signal based on the image data, where the status indicates when the traffic light signal is red, yellow, or green.

Sometimes an obstruction may occlude the line-of-sight between the camera of the autonomous vehicle and the traffic light signal. For example, a lead vehicle having an increased height such as a semi-truck may be positioned directly in front of the autonomous vehicle at an intersection. Because of the relative height of the semi-truck, the line-of-sight between the camera and the traffic light signal is occluded. As a result, the autonomous vehicle is no longer able to determine the status of the traffic light at the intersection based on the image data captured by the camera. In some instances, the status of the traffic light signal may be communicated to the autonomous vehicle over a vehicle-to-everything (V2X) communication network instead. However, it is to be appreciated that V2X communication may not be widely implemented between traffic light signal controllers and road vehicles.

Thus, while current systems for autonomous vehicles achieve their intended purpose, there is a need in the art for an improved approach for determining a status of a traffic control device when the line-of-sight between a camera and the traffic control device is occluded by an obstruction.

SUMMARY

According to several aspects, a preemptive maneuvering system for viewing a status of a traffic control device by one or more cameras of an autonomous vehicle is disclosed. A moving obstruction is in front of the autonomous vehicle. The preemptive maneuvering system includes one or more controllers executing instructions to monitor a current position of the autonomous vehicle until the autonomous vehicle is within a predefined distance from the traffic control device. In response to determining the autonomous vehicle is within the predefined distance from the traffic control device, the one or more controllers monitor image data collected from the one or more cameras to determine the status of the traffic control device. The one or more controllers continue to monitor the image data until a line-of-sight between the one or more cameras and the traffic control device is occluded by the moving obstruction. In response to determining the line-of-sight between the one or more cameras and the traffic control device is occluded, the one or more controllers calculate a target following distance between the autonomous vehicle and the moving obstruction. The one or more controllers instruct the autonomous vehicle to execute one or more preemptive maneuvers to position the autonomous vehicle at the target following distance from the moving obstruction.

In another aspect, positioning the autonomous vehicle at the target following distance results in unblocking the line-of-sight between the one or more cameras and the traffic control device.

In another aspect, the target following distance is determined by:

$$d_{follow} = d_{TCD} \frac{h_{LEAD} - h_{CAMERA}}{h_{TCD} - h_{CAMERA}}$$

where $d_{follow}$ is the target following distance, $d_{TCD}$ is a distance from the autonomous vehicle to the traffic control device, $h_{LEAD}$ is a height of the moving obstruction, $h_{TCD}$ is a height of the traffic control device, and $h_{CAMERA}$ is a height of the one or more cameras.

In yet another aspect, a height of the traffic control device is determined by:

$$h_{TCD} = d_{TCD} \frac{h_{LEAD} - h_{CAMERA}}{d_{LEAD}} + h_{CAMERA}$$

where $d_{LEAD}$ is a lead distance from the moving obstruction measured as the autonomous vehicle approaches the moving obstruction.

In an aspect, the status of the traffic control device indicates when the autonomous vehicle should go, slow down, and stop.

In another aspect, the one or more preemptive maneuvers include at least one of the following: slow-down motion and slow-start motion.

In yet another aspect, the one or more controllers execute instructions to compare the target following distance with a threshold distance, and in response to determining the target following distance is less than the threshold distance, instruct the autonomous vehicle to execute one or more preemptive maneuvers.

In an aspect, the threshold distance represents a maximum distance allowed between the autonomous vehicle and the moving obstruction without impeding traffic.

In another aspect, the traffic control device is a traffic light.

In yet another aspect, the moving obstruction is a lead vehicle.

In an aspect, a method for executing one or more preemptive maneuvers to position an autonomous vehicle at a target following distance from a moving obstruction by a preemptive maneuvering system is disclosed. The moving obstruction is in front of the autonomous vehicle. The method includes monitoring, by one or more controllers, a current position of the autonomous vehicle until the autonomous vehicle is within a predefined distance from a traffic control device. In response to determining the autonomous vehicle is within the predefined distance from the traffic control device, the method includes monitoring, by the one or more controllers, image data collected from one or more cameras to determine a status of the traffic control device. The method includes continuing to monitor the image data until a line-of-sight between the one or more cameras and the traffic control device is occluded by the moving obstruction. In response to determining the line-of-sight between the one or more cameras and the traffic control device is occluded, the method includes calculating a target following distance between the autonomous vehicle and the moving obstruction. Finally, the method includes instructing the autonomous vehicle to execute one or more preemptive maneuvers to position the autonomous vehicle at the target following distance from the moving obstruction.

In another aspect, the method further comprises determining the target following distance by:

$$d_{follow} = d_{TCD} \frac{h_{LEAD} - h_{CAMERA}}{h_{TCD} - h_{CAMERA}}$$

where $d_{follow}$ is the target following distance, $d_{TCD}$ is a distance from the autonomous vehicle to the traffic control device, $h_{LEAD}$ is a height of the moving obstruction, $h_{TCD}$ is a height of the traffic control device, and $h_{CAMERA}$ is a height of the one or more cameras.

In yet another aspect, the method further comprises determining the height of the traffic control device by:

$$h_{TCD} = d_{TCD} \frac{h_{LEAD} - h_{CAMERA}}{d_{LEAD}} + h_{CAMERA}$$

where $d_{lead}$ is a lead distance from the moving obstruction measured as the autonomous vehicle approaches the moving obstruction.

In an aspect, the method further comprises comparing the target following distance with a threshold distance, and in response to determining the target following distance is less than the threshold distance, the method includes instructing the autonomous vehicle to execute one or more preemptive maneuvers.

In another aspect, a preemptive maneuvering system for viewing a status of a traffic control device by one or more cameras of an autonomous vehicle is disclosed. A moving obstruction is in front of the autonomous vehicle. The preemptive maneuvering system includes one or more controllers executing instructions to monitor a current position of the autonomous vehicle until the autonomous vehicle is within a predefined distance from the traffic control device. In response to determining the autonomous vehicle is within the predefined distance from the traffic control device, the one or more controllers monitor image data collected from the one or more cameras to determine the status of the traffic control device. The one or more controllers continue to monitor the image data until detecting the presence of the moving obstruction in front of the autonomous vehicle. In response to detecting the presence of the moving obstruction, the one or more controllers calculate one or more virtual bounding boxes that are overlain upon a frame of the image data captured by the one or more cameras, where the one or more virtual bounding boxes each represent an anticipated position of an individual traffic control device. In response to determining the presence of at least one visible traffic control device located within the one or more virtual bounding boxes, the one or more controllers instruct the autonomous vehicle to execute the one or more preemptive maneuvers to position the autonomous vehicle at a following distance from the moving obstruction, wherein the one or more preemptive maneuvers include a slow-down motion.

In another aspect, the one or more controllers execute instructions to dynamically adjust the following distance by minimizing an amount of pixel overlap in the frame of the image data captured by the one or more cameras between pixels representing a visible traffic control device and pixels representing the moving obstruction.

In yet another aspect, the one or more controllers execute instructions to in response to determining none of the traffic control devices are visible within the one or more virtual bounding boxes, instruct the autonomous vehicle to execute the one or more preemptive maneuvers to position the autonomous vehicle at the following distance from the moving obstruction, where the one or more preemptive maneuvers include one or more of the following: slow-down motion and slow-start motion.

In an aspect, the one or more controllers execute instructions to dynamically adjust the following distance by minimizing an amount of pixel overlap in the frame of the image data captured by the one or more cameras between pixels representing the one or more virtual bounding boxes and pixels representing the moving obstruction.

In another aspect, the traffic control device is a traffic light.

In yet another aspect, the moving obstruction is a lead vehicle.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
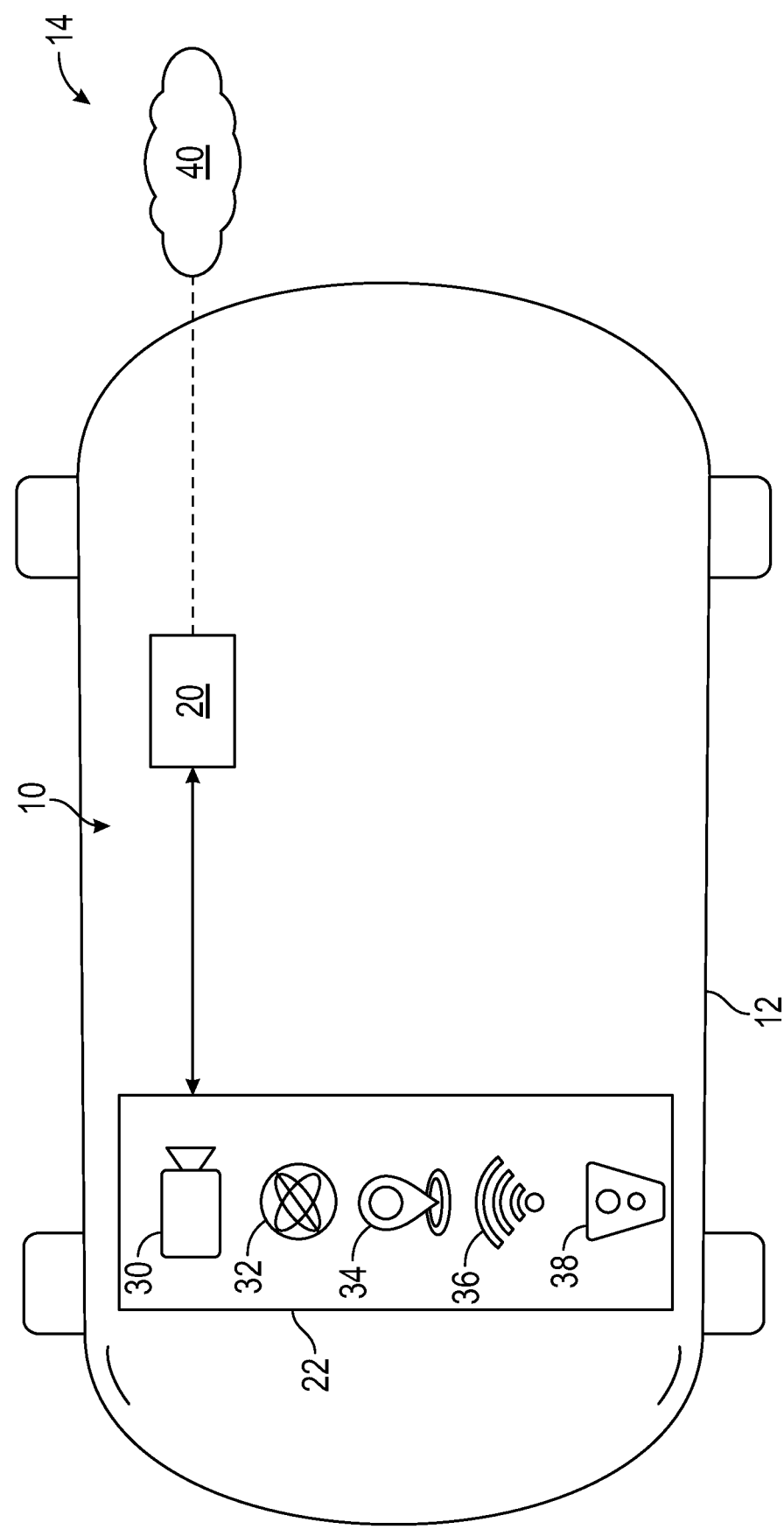
FIG. 1 is a schematic diagram of an autonomous vehicle including the disclosed preemptive maneuvering system, according to an exemplary embodiment.

Referring to FIG. 1, an exemplary preemptive maneuvering system 10 for an autonomous vehicle 12 is illustrated. It is to be appreciated that the autonomous vehicle 12 may be any type of vehicle such as, but not limited to, a sedan, truck, sport utility vehicle, van, or motor home. The autonomous vehicle 12 may include an automated driving system (ADS) or an advanced driver assistance system (ADAS) for assisting a driver with steering, braking, and/or accelerating. The preemptive maneuvering system 10 includes one or more controllers 20 in electronic communication with a plurality of perception sensors 22 that collect perception data that is indicative of an environment 14 surrounding the autonomous vehicle 12. The perception sensors 22 include one or more cameras 30, an inertial measurement unit (IMU) 32, a global positioning system (GPS) 34, radar 36, and LiDAR 38, however, is to be appreciated that additional or different perception sensors may be used as well. The one or more controllers 20 are also in wireless communication with one or more communication networks 40 to obtain map data as well. It is to be appreciated that the map data may be standard map data or, alternatively, high-definition (HD) map data.

Figure 2A:
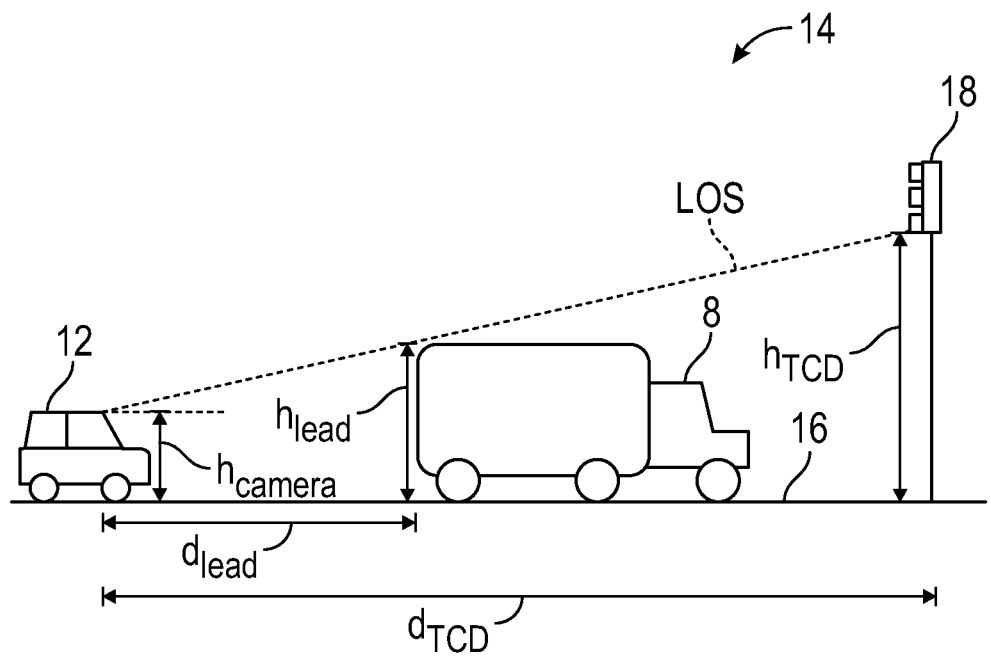
FIGS. 2A-2B are diagrams illustrating a line-of-sight between a camera that is part of the preemptive maneuvering system of the autonomous vehicle and a traffic control device occluded by a moving obstruction, which is a semi-truck, according to an exemplary embodiment.
Figure 2B:
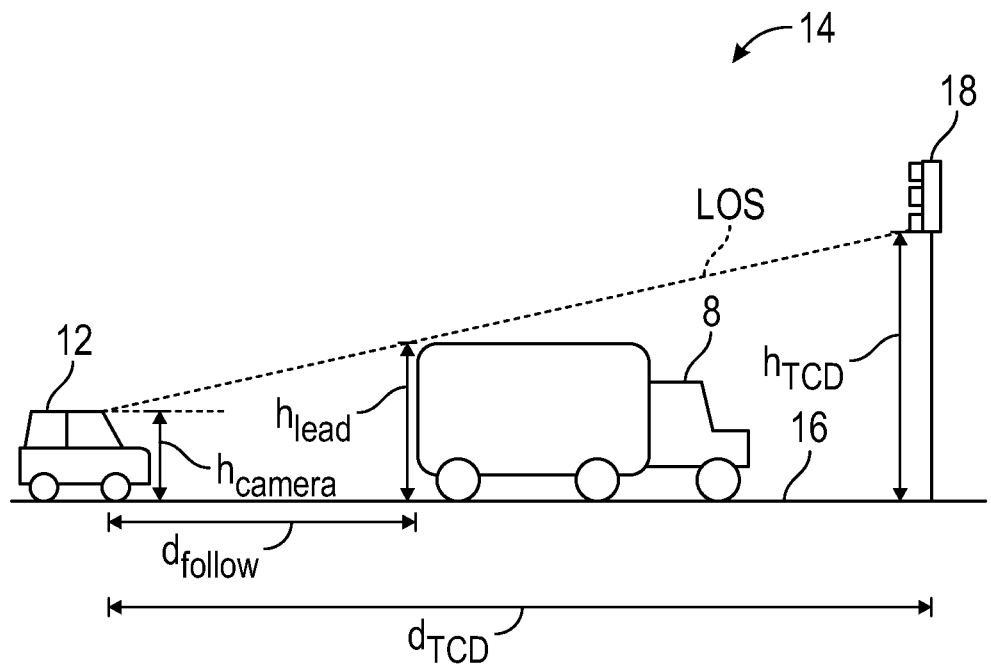

FIGS. 2A and 2B illustrate the autonomous vehicle 12 traveling along a roadway 16 located in the environment 14. A traffic control device 18 is in the environment 14 surrounding the autonomous vehicle 12, and directs traffic located in the roadway 16. The camera 30 (shown in FIG. 1) of the preemptive maneuvering system 10 is oriented to capture image data representative of the traffic control device 18, which is in front of the autonomous vehicle 12. Specifically, a line-of-sight LOS is located between the one or more cameras 30 and the traffic control device 18. However, a moving obstruction 8 in the environment 14 located in front of the autonomous vehicle 12 has the potential to obstruct the line-of-sight LOS between the one or more cameras 30 of the autonomous vehicle 12 and the traffic control device 18.

In the example as shown in FIGS. 2A and 2B, the traffic control device 18 is a traffic light, however, it is to be appreciated that the figures are merely exemplary in nature and other types of traffic control devices for instructing the flow of traffic may be used as well. For example, in another embodiment, the traffic control device 18 may be a stop sign or an individual who directs traffic such as a police officer. FIGS. 2A and 2B also illustrate the moving obstruction 8 as a lead vehicle located in front of the autonomous vehicle 12. Specifically, in the example as illustrated in FIGS. 2A and 2B, the lead vehicle is a semi-truck. However, it is to be appreciated that any other type of moving obstruction 8 may occlude the line-of-sight L between the one or more cameras 30 and the traffic control device 18 as well. It is also to be appreciated that in embodiments the moving obstruction 8 may be a stationary obstruction as well such as, for example, a tree limb, overhead bridge, or gantry.

FIG. 2A illustrates the autonomous vehicle 12 approaching the moving obstruction 8, where the autonomous vehicle 12 is positioned at a lead distance $d_{lead}$ from the moving obstruction 8. As explained below, the preemptive maneuvering system 10 determines a preemptive maneuver that positions the autonomous vehicle 12 at a target following distance $d_{follow}$, which is shown in FIG. 2B, from the moving obstruction 8 along the roadway 16. When the autonomous vehicle 12 is positioned at the target following distance $d_{follow}$, the line-of-sight LOS between the one or more cameras 30 and the traffic control device 18 is not occluded to allow for the one or more camera 30 to capture image data of the traffic control device 18. In other words, the preemptive maneuvering system 10 positions the autonomous vehicle 12 at the target following distance $d_{follow}$ to allow for the one or more cameras 30 to capture image data of the traffic control device 18.

The one or more controllers 20 determine the status of the traffic control device 18 based on the image data captured by the one or more cameras 30. It is to be appreciated that that one or more controllers 20 may determine the status of the traffic control device 18 based on the image data when a vehicle-to-everything (V2X) communication network has not been implemented between traffic light signal controllers and the one or more controllers 20 (FIG. 1), or when V2X communication is unavailable.

Figure 3:
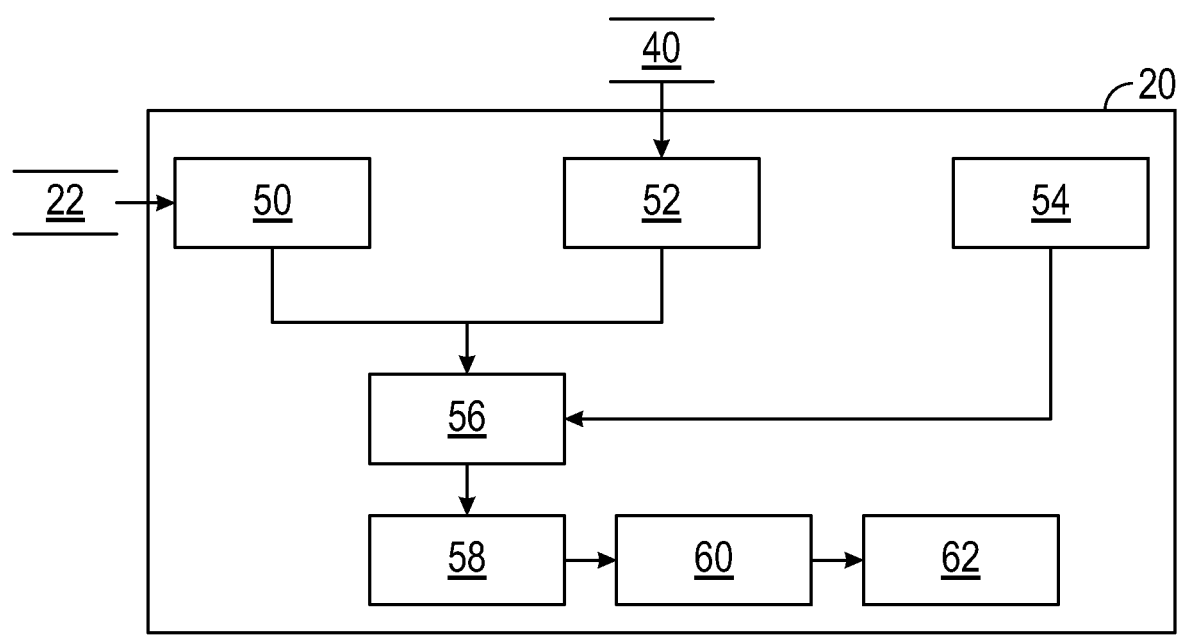
FIG. 3 is a diagram illustrating one embodiment of the one or more controllers shown in FIG. 1, according to an exemplary embodiment.

FIG. 3 is a diagram illustrating an embodiment the one or more controllers 20 of the preemptive maneuvering system 10, where the one or more controllers 20 include a perception module 50, a map module 52, a route planning module 54, a localization module 56, a status module 58, a distance module 60, and a motion module 62. Referring to both FIGS. 1 and 3, the perception module 50 receives the data from the plurality of perception sensors 22 and determines perception data based on the data received from plurality of perception sensors 22. The map module 52 receives the map data from the communication network 40. The localization module 56 receives the perception data from the perception module 50 and the map data from the map module 52 and determines a current position of the autonomous vehicle 12 relative to the environment 14 based on the perception data and the map data.

The status module 58 receives the position of the autonomous vehicle 12 relative to the environment from the localization module 56, the perception data, the map data, and route information from the route planning module 54. In the embodiment as shown in FIG. 3, the map data may be standard map data as opposed to HD map data. The status module 58 determines when the autonomous vehicle 12 is within a predefined distance from the traffic control device 18 based on the position of the autonomous vehicle 12, the perception data, the map data, and the route information. The autonomous vehicle 12 either turns or drives straight through an intersection corresponding to the traffic control device 18 (FIGS. 2A and 2B). The predefined distance is selected to ensure that the autonomous vehicle 12 detects the traffic control device 18 situated along its route while at the same time ensuring that the algorithm to determine the preemptive maneuver that positions the autonomous vehicle 12 at a target following distance $d_{follow}$ (FIG. 2B) is not prematurely triggered. In one non-limiting embodiment, the predefined distance is about 100 meters.

In response to determining the autonomous vehicle 12 is within the predefined distance from the traffic control device 18, the status module 58 then monitors the perception data, and in particular the image data collected from the one or more cameras 30, to determine the status of the traffic control device 18. The status of the traffic control device 18 indicates when the autonomous vehicle 12 should proceed (i.e., when the traffic signal is green), slow down (i.e., when the traffic signal is yellow), or stop (i.e., when the traffic signal is red).

Referring to FIGS. 1, 2A, and 3, the status module 58 of the one or more controllers 20 continues to monitor the perception data, and in particular the image data collected from the one or more cameras 30, until the line-of-sight LOS between the camera 30 and the traffic control device 18 is occluded by the moving obstruction 8 and the one or more cameras 30 are no longer able to view the status of the traffic control device 18. In response to determining the light-ofsight LOS is occluded by the moving obstruction 8, the distance module 60 of the one or more controllers 20 calculates the target following distance $d_{follow}$ from the moving obstruction 8 along the roadway 16, which is shown in FIG. 2B.

Calculating the target following distance $d_{follow}$ shall now be explained. Referring to FIGS. 2A and 3, the distance module 60 first determines a height $h_{TCD}$ of the traffic control device 18 measured from the roadway 16 in the event the map data does not include the height $h_{TCD}$. The distance module 60 of the one or more controllers 20 determine a distance from the autonomous vehicle 12 to the traffic control device $d_{TCD}$ based on the standard map data. If the standard map data does not indicate the distance to the traffic control device $d_{TCD}$, then the distance module 60 may estimate the distance to the traffic control device $d_{TCD}$ based on a distance to the intersection where the traffic control device 18 is located. The height $h_{TCD}$ is determined based on the image data collected from the one or more cameras 30 (FIG. 1) right before the line-of-sight L between the camera 30 and the traffic control device 18 was occluded by the moving obstruction 8. The height $h_{TCD}$ to the traffic control device 18 is determined based on Equation 1, which is:

$$h_{TCD} = d_{TCD} \frac{h_{LEAD} - h_{CAMERA}}{d_{LEAD}} + h_{CAMERA} \qquad \text{Equation 1}$$

where $h_{LEAD}$ is a height of the moving obstruction 8 that is determined based on the image data and $h_{CAMERA}$ is a mounting height of the one or more cameras 30 of the autonomous vehicle 12, where the height $h_{CAMERA}$ of the one or more cameras 30, the height $h_{LEAD}$ of the moving obstruction 8, and the height $h_{TCD}$ of the traffic control device 18 are measured from the roadway 16 are measured relative to the roadway 16. It is to be appreciated that estimating the distance to the traffic control device $d_{TCD}$ may be extended to accommodate curvature in the roadway 16 as well.

Referring to FIGS. 2B and 3, the distance module 60 calculates the target following distance $d_{follow}$ based on the estimated height $h_{TCD}$ of the traffic control device 18 and is expressed in Equation 2, which is:

$$d_{follow} = d_{TCD} \frac{h_{LEAD} - h_{CAMERA}}{h_{TCD} - h_{CAMERA}} \qquad \text{Equation 2}$$

It is to be appreciated that the target following distance $d_{follow}$ may include a margin of error especially since standard map data, and not HD map data, is available. The margin of error accounts for the uncertainty in the estimated height $h_{TCD}$ to the traffic control device 18 and the height $h_{LEAD}$ of the moving obstruction 8.

The distance module 60 then compares the target following distance $d_{follow}$ with a threshold distance, where the threshold distance represents the maximum distance allowed between the autonomous vehicle 12 and the moving obstruction 8, without impeding traffic traveling along the roadway 16. In one exemplary embodiment, the threshold distance is equal to a distance the autonomous vehicle 12 would travel at its current speed in four seconds. In another non-limiting embodiment, for fully stopped traffic the threshold distance would be about 14 meters. In response to determining the target following distance $d_{follow}$ is greater than the threshold distance, the motion module 62 may then instruct the autonomous vehicle 12 to enter an adjacent lane along the roadway 16. If there is no adjacent lane relative to the autonomous vehicle 12, then the motion module 62 may then instruct the autonomous vehicle 12 to infer the status of the traffic control device 18 based on the motion of other following vehicles, such as the vehicles located in the adjacent or crossing lanes. In the event the status of the traffic control device 18 is unable to be inferred based on the motion of the surrounding vehicles, then the motion module 62 may generate one or more human machine interface (HMI) requests for user control.

In response to determining the target following distance $d_{follow}$ is less than the threshold distance, the motion module 62 may then instruct the autonomous vehicle 12 to execute one or more preemptive maneuvers to position the autonomous vehicle 12 at the target following distance $d_{follow}$ from the moving obstruction 8 along the roadway 16. The one or more preemptive maneuvers include, but are not limited to, forward or slow-down motion and slow-start motion to achieve the target following distance $d_{follow}$ from the moving obstruction 8 along the roadway 16. Slow-down motion refers to motion of the autonomous vehicle 12 when approaching the moving obstruction 8, where the slow-down motion works by decelerating the autonomous vehicle 12 to the slowest speed possible given the circumstances. Slow-start motion refers to motion of the autonomous vehicle 12 once the autonomous vehicle 12 has already come to a stop behind the moving obstruction 8, where the slow-start motion works by accelerating the autonomous vehicle 12 as slowly as possible given the circumstances once the moving obstruction 8 starts moving after coming to a stop. It is to be appreciated that the preemptive maneuver accommodates the margin of error of the target following distance $d_{follow}$. It is also to be appreciated that the one or more preemptive maneuvers are constrained to match a curvature of the roadway 16 as well.

In the event the line-of-sight LOS between the one or more cameras 30 and the traffic control device 18 remains occluded even when the autonomous vehicle 12 is positioned at the target following distance $d_{follow}$ from the moving obstruction 8, the motion module 62 may then instruct the autonomous vehicle 12 to enter the adjacent lane along the roadway 16. If there is no adjacent lane relative to the autonomous vehicle 12, then the motion module 62 may then instruct the autonomous vehicle 12 to infer the status of the traffic control device 18 based on the motion of other following vehicles, such as the vehicles located in the adjacent or crossing lanes. In the event the status of the traffic control device 18 is unable to be inferred based on the motion of the surrounding vehicles, then the motion module 62 may generate one or more HMI requests for user control.

Figure 4:
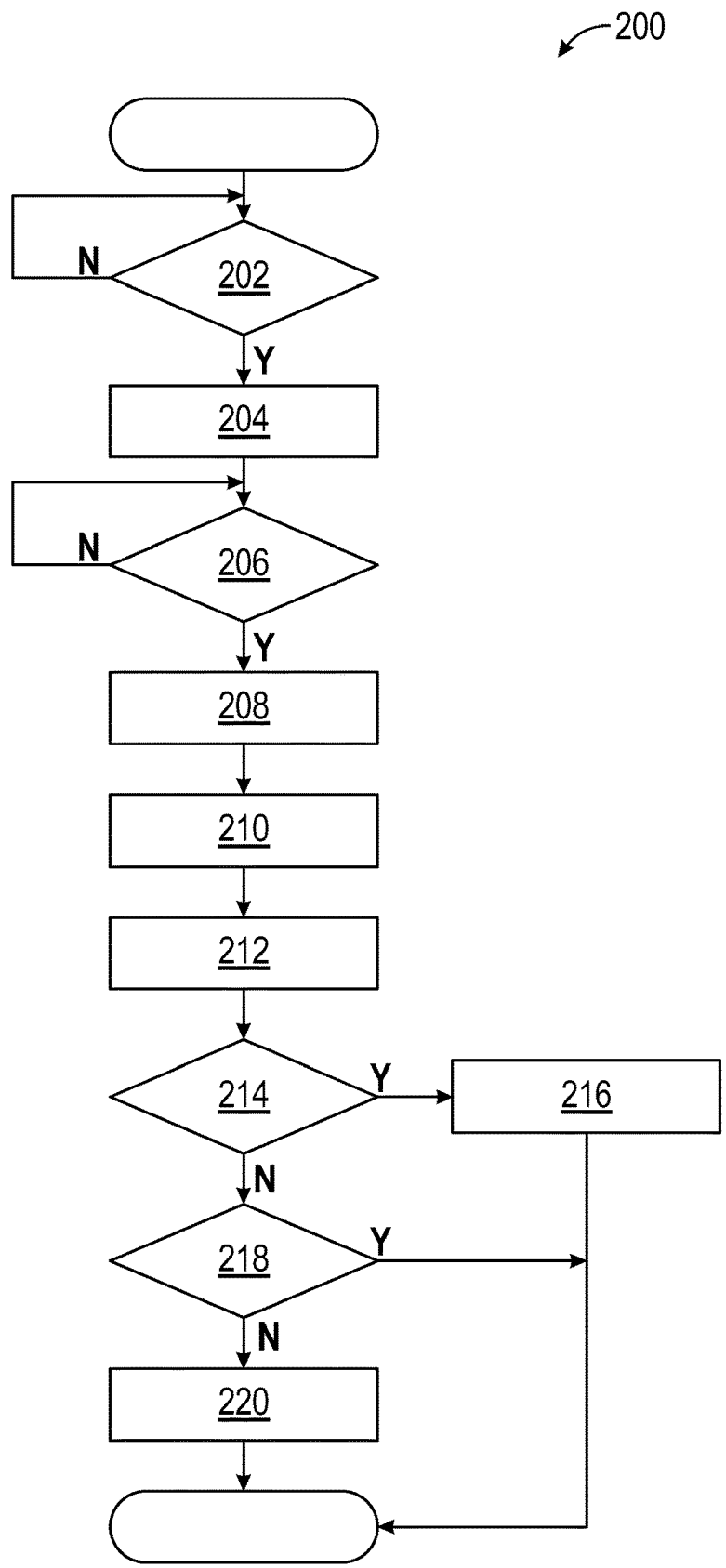
FIG. 4 is a process flow diagram illustrating a method for executing the preemptive maneuver, according to an exemplary embodiment.
Figure 7:
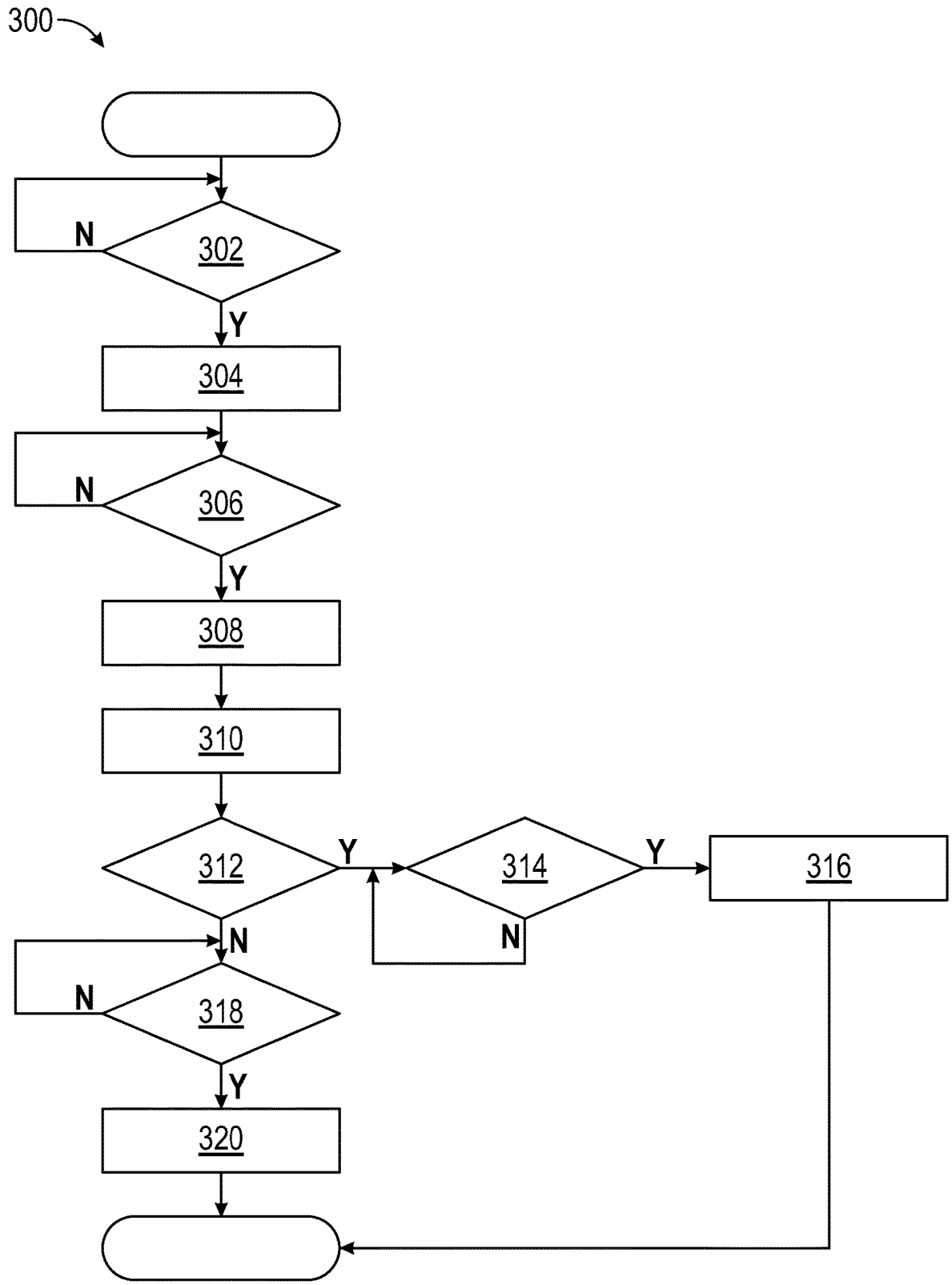
FIG. 7 is a process flow diagram illustrating another embodiment of a method for executing the preemptive maneuver, according to an exemplary embodiment.

FIG. 4 is an exemplary process flow diagram illustrating a method 200 for executing the one or more preemptive maneuvers to position the autonomous vehicle 12 at the target following distance $d_{follow}$ from the moving obstruction 8 along the roadway 16 by the preemptive maneuvering system 10. It is to be appreciated that the approach as shown in FIG. 4 is applicable in situations where standard map data, and not HD map data, is available. FIG. 7 illustrates an alternative method 300 for positioning the autonomous vehicle 12 in the event HD map data is available, which is described below.

Referring generally to FIGS. 1-4, the method 200 may begin at decision block 202. In decision block 202, the status module 58 of the one or more controllers 20 monitor the current position of the autonomous vehicle 12 relative to the environment, the perception data, the map data, and route information from the route planning module 54 until the autonomous vehicle 12 is within the predefined distance from the traffic control device 18, where the predefined distance is selected to ensure that the autonomous vehicle 12 detects the traffic control device 18 situated along its route while at the same time ensuring that the algorithm to determine the one or more preemptive maneuvers that position the autonomous vehicle 12 at a target following distance $d_{follow}$ (FIG. 2B) is not prematurely triggered. The method 200 may then proceed to block 204.

In block 204, in response to determining the autonomous vehicle 12 is within the predefined distance from the traffic control device 18, the status module 58 of the one or more controllers 20 then monitors the image data collected from the one or more cameras 30 to determine the status of the traffic control device 18, where traffic control device 18 is in front of the autonomous vehicle 12. The method 200 may then proceed to decision block 206.

In decision block 206, the status module 58 of the one or more controllers 20 continues to monitor the image data until the line-of-sight L between the camera 30 and the traffic control device 18 is occluded by the moving obstruction 8. Once the line-of-sight LOS is occluded, the method 200 may then proceed to block 208.

In block 208, the distance module 60 of the one or more controllers 20 determines the height $h_{TCD}$ of the traffic control device 18 measured from the roadway 16. It is to be appreciated that block 208 may be omitted in the event the standard map data includes the height $h_{TCD}$ of the traffic control device 18. The method 200 may then proceed to block 210.

In block 210, the distance module 60 of the one or more controllers 20 calculates the target following distance $d_{follow}$ between the autonomous vehicle 12 and the moving obstruction 8. The method 200 may then proceed to block 212.

In block 212, the distance module 60 of the one or more controllers 20 compares the target following distance $d_{follow}$ with the threshold distance, where the threshold distance represents the maximum distance allowed between the autonomous vehicle 12 and the moving obstruction 8, without impeding traffic traveling along the roadway 16. The method 200 may then proceed to decision block 214.

In decision block 214, in response to determining the target following distance $d_{follow}$ is greater than the threshold distance, the method proceed to block 216. In block 216, the motion module 62 of the one or more controllers 20 instruct the autonomous vehicle 12 to enter an adjacent lane along the roadway 16. If there is no adjacent lane relative to the autonomous vehicle 12, then the motion module 62 may then instruct the autonomous vehicle 12 to infer the status of the traffic control device 18 based on the motion of other following vehicles, such as the vehicles located in the adjacent or crossing lanes. In the event the status of the traffic control device 18 is unable to be inferred based on the motion of the surrounding vehicles, then the motion module 62 may generate one or more HMI requests for user control. The method 200 may then terminate.

Referring to the decision block 214, in response to determining the target following distance $d_{follow}$ is less than the threshold distance, the motion module 62 of the one or more controllers 20 instruct the autonomous vehicle 12 to execute one or more preemptive maneuvers to position the autonomous vehicle 12 at the target following distance $d_{follow}$ from the moving obstruction 8 along the roadway 16. The method 200 may then proceed to decision block 218.

In decision block 218, in response to determining the line-of-sight LOS between the one or more cameras 30 and the traffic control device 18 is not occluded and the one or more cameras 30 may view the traffic control device 18, the method 200 terminates. However, in the event the line-of-sight LOS between the one or more cameras 30 and the traffic control device 18 remains occluded, the method 200 may proceed to block 220.

In block 218, the motion module 62 instructs the autonomous vehicle 12 to enter the adjacent lane along the roadway 16. If there is no adjacent lane relative to the autonomous vehicle 12, then the motion module 62 may then instruct the autonomous vehicle 12 to infer the status of the traffic control device 18 based on the motion of other following vehicles, such as the vehicles located in the adjacent or crossing lanes. In the event the status of the traffic control device 18 is unable to be inferred based on the motion of the surrounding vehicles, then the motion module 62 may generate one or more HMI requests for user control. The method 200 may then terminate.

Figure 5:
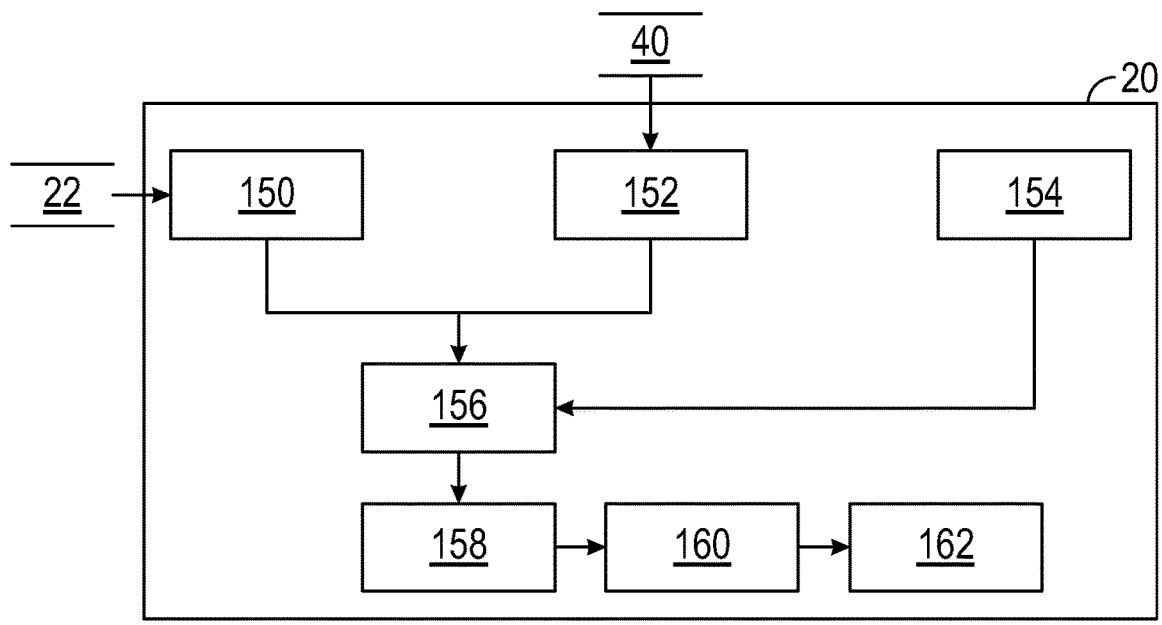
FIG. 5 is a diagram illustrating one embodiment of the one or more controllers shown in FIG. 1, according to an exemplary embodiment.

FIG. 5 is a diagram illustrating another embodiment the one or more controllers 20 of the preemptive maneuvering system 10 (FIG. 1), where the one or more controllers 20 include a perception module 150, a map module 152, a route planning module 154, a localization module 156, a status module 158, a boundary module 160, and a motion module 162. It is to be appreciated that in the approach as shown in FIG. 5, HD map data that allows for at least lane-level accuracy is available to the map module 152.

Referring to both FIGS. 1 and 5, the status module 158 receives the perception data from the perception module 150, the map data from the map module 152, the position of the autonomous vehicle 12 relative to the environment from the localization module 156, and route information from the route planning module 154. The status module 158 determines when the autonomous vehicle 12 is within a predefined distance from the traffic control device 18 based on the perception data, the map data, and the route information. As mentioned above, the predefined distance is selected to ensure the algorithm to determine the preemptive maneuver that positions the autonomous is not prematurely triggered.

Figure 6:
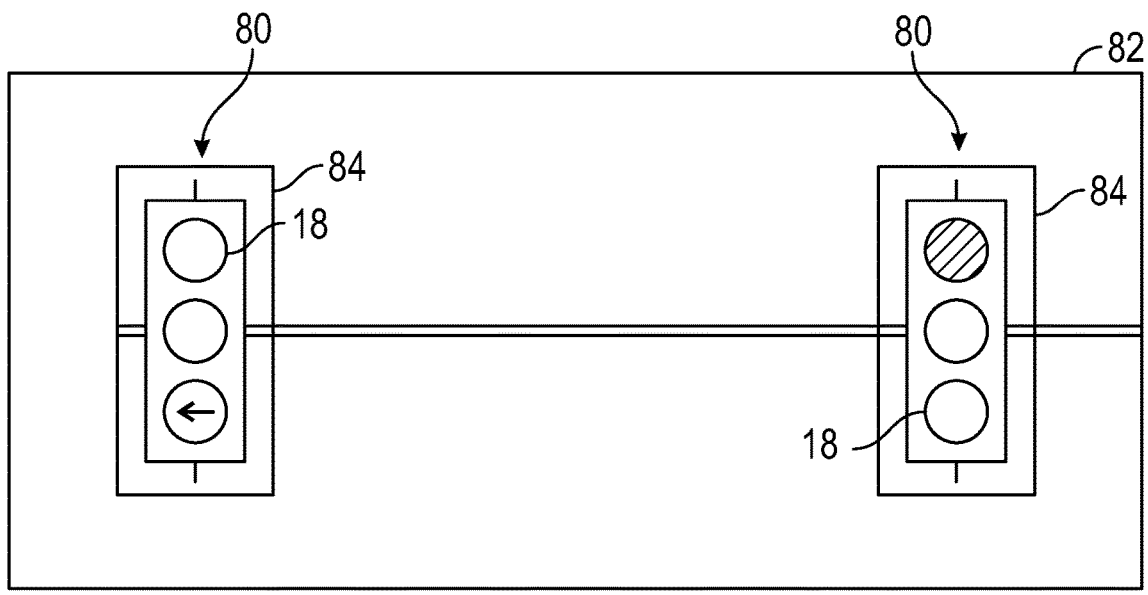
FIG. 6 is an illustration of a camera frame capturing two traffic control devices and two bounding boxes that are calculated by the one or more controllers shown in FIG. 5, according to an exemplary embodiment.

In response to determining the autonomous vehicle 12 is within the predefined distance from the traffic control device 18, the status module 158 then monitors the image data collected from the one or more cameras 30 to determine the status of the traffic control device 18. The status module 158 continues to monitor the image data from the one or more cameras 30 until detecting the presence of the moving obstruction 8 (FIGS. 2A and 2B) in front of the autonomous vehicle 12. It is to be appreciated that in the event the roadway 16 is a multi-lane road, the moving obstruction 8 may be in an adjacent lane as well. In response to determining the presence of the moving obstruction 8 in front of the autonomous vehicle 12, the boundary module 160 of the one or more controllers 20 then calculates one or more virtual bounding boxes 80 that are overlain upon a frame 82 of the image data captured by the one or more cameras 30 and are shown in FIG. 6. The virtual bounding boxes 80 each represent an anticipated position of an individual traffic control device 18. In the example as shown in FIG. 6, there are two traffic lights, so two virtual bounding boxes 80 are calculated. The virtual bounding boxes 80 each comprise of an enclosed boundary 84 that defines the anticipated position of a traffic control device 18. The virtual bounding boxes 80 are determined based on the position of the autonomous vehicle 12, the map data, and an anticipated maneuver that the autonomous vehicle 12 is about to execute.

The boundary module 160 of the one or more controllers 20 then compares the image data that is part of the frame 82 with the virtual bounding boxes 80 to determine the presence of at least one visible traffic control device 18 located within one of the virtual bounding boxes 80. In other words, the boundary module 160 determines if at least one of the traffic control devices 18 are visible to one or more cameras 30 (FIG. 1), or if the moving obstruction 8 (FIG. 2A) has occluded the traffic control devices 18 from view by the one or more cameras 30. As explained below, the preemptive maneuver selected by the positioning module 162 is determined based on if the one or more cameras 30 may view at least one traffic control device 18. It is to be appreciated that in the event the traffic control devices 18 are not visible to the one or more cameras 30 but the moving obstruction 8 is not located within the field-of-view of the one or more cameras 30, the map data may not be up to date with the correct location of the traffic control devices 18, and a notification is sent to the one or more communication networks 40 (FIG. 1).

In response to determining the presence of at least one visible traffic control device 18 located within one of the virtual bounding boxes 80, the positioning module 162 of the one or more controllers 20 instructs the autonomous vehicle 12 to execute the one or more preemptive maneuvers to position the autonomous vehicle 12 at a following distance from the moving obstruction 8 (FIG. 2A), where the preemptive maneuver is the slow-down motion. The slow-down motion decelerates the autonomous vehicle 12 to the slowest speed possible while still maintaining the visibility of the one or more traffic control devices 18 and stops the autonomous vehicle 12 when the moving obstruction 8 also stops.

The following distance is dynamically adjusted based on a visibility of the one or more traffic control devices 18. That is, the following distance is dynamically calculated to maintain the one or more traffic control devices 18 remaining unblocked by the moving obstruction 8, where the following distance is less than the threshold distance. As mentioned above, the threshold distance represents the maximum distance allowed between the autonomous vehicle 12 and the moving obstruction 8, without impeding traffic traveling along the roadway 16 (FIGS. 2A and 2B). Specifically, the positioning module 162 of the one or more controllers 20 dynamically adjusts the following distance by minimizing an amount of pixel overlap in the frame 82 of the image data captured by the one or more cameras 30 between pixels representing a visible traffic control device 18 and pixels representing the moving obstruction 8. Referring specifically to FIG. 6, it is to be appreciated that in some instances, a portion of the moving obstruction 8 may be positioned within one of the virtual bounding boxes 80, however, the traffic control device 18 is still visible.

In response to determining none of the traffic control devices 18 are visible within the virtual bounding boxes 80, the positioning module 162 of the one or more controllers 20 instructs the autonomous vehicle 12 to execute the one or more preemptive maneuvers to position the autonomous vehicle 12 at the following distance from the moving obstruction 8 (FIGS. 2A and 2B), where the one or more preemptive maneuvers include the slow-down motion, the slow-start motion, or both the slow-down motion and the slow-start motion. The slow-down motion decelerates the autonomous vehicle 12 to the slowest speed possible to regain visibility of the one or more traffic control devices 18. The slow-start motion accelerates the autonomous vehicle 12 at a rate as slow as possible once the moving obstruction 8 begins moving after coming to a stop to regain visibility of the one or more traffic control devices 18. Specifically, the positioning module 162 of the one or more controllers 20 dynamically adjusts the following distance by minimizing an amount of pixel overlap in the frame 82 of the image data captured by the one or more cameras 30 between pixels representing the virtual bounding boxes 80 and pixels representing the moving obstruction 8. In the event the one or more cameras 30 are unable to regain visibility of the traffic control device 18, the following distance is equal to the threshold distance to maintain the maximum distance allowed between the autonomous vehicle 12 and the moving obstruction 8.

In some instances, it may not be possible to maintain visibility of the one or more traffic control devices 18 when executing the one or more preemptive maneuvers to position the autonomous vehicle 12 at the following distance from the moving obstruction 8. In this situation, the positioning module 162 of the one or more controllers 20 dynamically adjusts the following distance to the moving obstruction 8 based on the approach as described when none of the traffic control devices 18 are visible within the virtual bounding boxes 80.

FIG. 7 is an exemplary process flow diagram illustrating a method 300 for executing the one or more preemptive maneuvers to position the autonomous vehicle 12 to view the traffic control devices 18. Referring generally to FIGS. 1 and 5-7, the method 300 may begin at decision block 302. In decision block 302, the status module 158 of the one or more controllers 20 monitor the current position of the autonomous vehicle 12 relative to the environment, the perception data, the map data, and route information from the route planning module 54 until the autonomous vehicle 12 is within the predefined distance from the traffic control device 18, where the predefined distance is selected to ensure the algorithm to determine the one or more preemptive maneuvers is not prematurely triggered. The method 300 may then proceed to block 304.

In block 304, in response to determining the autonomous vehicle 12 is within the predefined distance from the traffic control device 18, the status module 158 of the one or more controllers 20 then monitors the image data collected from the one or more cameras 30 to determine the status of the traffic control device 18, where traffic control device 18 is in front of the autonomous vehicle 12. The method 300 may then proceed to decision block 306.

In decision block 306, the status module 158 of the one or more controllers 20 continues to monitor the image data until detecting the presence of the moving obstruction 8 (FIGS. 2A and 2B) in front of the autonomous vehicle 12. Once the moving obstruction 8 is detected, the method 300 may then proceed to block 308.

In block 308, in response to determining the presence of the moving obstruction 8, the boundary module 160 of the one or more controllers 20 calculates one or more virtual bounding boxes 80 that are overlain upon the frame 82 of the image data captured by the one or more cameras 30. The method 300 may then proceed to block 310.

In block 310, the boundary module 160 of the one or more controllers 20 compare the image data that is part of the frame 82 with the virtual bounding boxes 80 to determine the presence of at least one visible traffic control device 18 located within one of the virtual bounding boxes 80. The method 300 may then proceed to decision block 312.

In decision block 312, in response to determining the presence of at least one visible traffic control device 18 located within one of the virtual bounding boxes 80, the positioning module 162 of the one or more controllers 20 instructs the autonomous vehicle 12 to execute the one or more preemptive maneuvers to position the autonomous vehicle 12 at the following distance from the moving obstruction 8 (FIGS. 2A and 2B), where the preemptive maneuver is the slow-down motion. The method 300 may then proceed to decision block 314.

In decision block 314, the positioning module 162 of the one or more controllers 20 continues to compare the following distance with the threshold distance, until determining the following distance is greater than the threshold distance. In response to determining the following distance is greater than the threshold distance, the method 300 proceeds to block 316.

In block 316, in response to determining the following distance is greater than the threshold distance, the motion module 162 of the one or more controllers 20 instruct the autonomous vehicle 12 to enter an adjacent lane along the roadway 16. If there is no adjacent lane relative to the autonomous vehicle 12, then the motion module 62 may then instruct the autonomous vehicle 12 to infer the status of the traffic control device 18 based on the motion of other following vehicles, such as the vehicles located in the adjacent or crossing lanes. In the event the status of the traffic control device 18 is unable to be inferred based on the motion of the surrounding vehicles, then the motion module 62 may generate one or more HMI requests for user control. The method 300 may then terminate.

Referring to decision block 312, to determining none of the traffic control devices 18 are visible within the virtual bounding boxes 80, the positioning module 162 of the one or more controllers 20 instructs the autonomous vehicle 12 to execute the one or more preemptive maneuvers to position the autonomous vehicle 12 at the following distance from the moving obstruction 8 (FIGS. 2A and 2B), where the one or more preemptive maneuvers include the slow-down motion, the slow-start motion, or both the slow-down motion and the slow-start motion. The method 300 may then proceed to decision block 318.

In decision block 318, the positioning module 162 of the one or more controllers 20 continues to compare the following distance with the threshold distance, until determining the following distance is greater than the threshold distance. In response to determining the following distance is greater than the threshold distance, the method 300 proceeds to block 320.

In block 320, in response to determining the following distance is greater than the threshold distance, the motion module 162 of the one or more controllers 20 instruct the autonomous vehicle 12 to enter an adjacent lane along the roadway 16. If there is no adjacent lane relative to the autonomous vehicle 12, then the motion module 62 may then instruct the autonomous vehicle 12 to infer the status of the traffic control device 18 based on the motion of other following vehicles, such as the vehicles located in the adjacent or crossing lanes. In the event the status of the traffic control device 18 is unable to be inferred based on the motion of the surrounding vehicles, then the motion module 62 may generate one or more HMI requests for user control. The method 300 may then terminate.

Referring generally to the figures, the disclosed preemptive maneuvering system provides various technical effects and benefits. Specifically, the preemptive maneuvering system detects a moving obstruction that blocks the traffic control device from view and performs one or more preemptive maneuvers to position the autonomous vehicle in a position where the traffic control device is viewable by the cameras. It is to be appreciated that the preemptive maneuvering system is especially advantageous when a vehicle-to-everything (V2X) communication network is not implemented between traffic light signal controllers and road vehicles.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A preemptive maneuvering system for viewing a status of a traffic control device by one or more cameras of an autonomous vehicle, wherein a moving obstruction is in front of the autonomous vehicle, the preemptive maneuvering system comprising:
one or more controllers executing instructions to:
monitor a current position of the autonomous vehicle until the autonomous vehicle is within a predefined distance from the traffic control device;
in response to determining the autonomous vehicle is within the predefined distance from the traffic control device and the traffic control device is occluded by the moving obstruction, calculate a height of the traffic control device by monitoring image data collected from the one or more cameras before the traffic control device was occluded by the moving obstruction to determine the status of the traffic control device, wherein the height of the traffic control device is determined by:

$$h_{TCD} = d_{TCD} \frac{h_{LEAD} - h_{CAMERA}}{d_{LEAD}} + h_{CAMERA}$$

wherein $d_{LEAD}$ is a lead distance from the moving obstruction measured as the autonomous vehicle approaches the moving obstruction, $d_{TCD}$ is a distance from the autonomous vehicle to the traffic control device, $h_{LEAD}$ is a height of the moving obstruction, $h_{TCD}$ is the height of the traffic control device, and $h_{CAMERA}$ is a height of the one or more cameras;
continue to monitor the image data until a line-of-sight between the one or more cameras and the traffic control device is occluded by the moving obstruction;
in response to determining the line-of-sight between the one or more cameras and the traffic control device is occluded, calculate a target following distance between the autonomous vehicle and the moving obstruction; and instruct the autonomous vehicle to execute one or more preemptive maneuvers to position the autonomous vehicle at the target following distance from the moving obstruction.

2. The preemptive maneuvering system of claim 1, wherein positioning the autonomous vehicle at the target following distance results in unblocking the line-of-sight between the one or more cameras and the traffic control device.

3. The preemptive maneuvering system of claim 1, wherein the target following distance is determined by:

$$d_{follow} = d_{TCD}\frac{h_{LEAD} - h_{CAMERA}}{h_{TCD} - h_{CAMERA}}$$

wherein $d_{follow}$ is the target following distance.

4. The preemptive maneuvering system of claim 1, wherein the status of the traffic control device indicates when the autonomous vehicle should go, slow down, and stop.

5. The preemptive maneuvering system of claim 1, wherein one or more preemptive maneuvers include at least one of the following: slow-down motion and slow-start motion.

6. The preemptive maneuvering system of claim 1, wherein the one or more controllers execute instructions to:
compare the target following distance with a threshold distance; and
in response to determining the target following distance is less than the threshold distance, instruct the autonomous vehicle to execute one or more preemptive maneuvers.

7. The preemptive maneuvering system of claim 6, wherein the threshold distance represents a maximum distance allowed between the autonomous vehicle and the moving obstruction without impeding traffic.

8. The preemptive maneuvering system of claim 1, wherein the traffic control device is a traffic light.

9. The preemptive maneuvering system of claim 1, wherein the moving obstruction is a lead vehicle.

10. A method for executing one or more preemptive maneuvers to position an autonomous vehicle at a target following distance from a moving obstruction by a preemptive maneuvering system, wherein the moving obstruction is in front of the autonomous vehicle, the method comprising:
monitoring, by one or more controllers, a current position of the autonomous vehicle until the autonomous vehicle is within a predefined distance from a traffic control device;
in response to determining the autonomous vehicle is within the predefined distance from the traffic control device and the traffic control device is occluded by the moving obstruction, calculating a height of the traffic control device by monitoring image data collected from one or more cameras before the traffic control device was occluded by the moving obstruction to determine the status of the traffic control device, wherein the height of the traffic control device is determined by $$h_{TCD} = d_{TCD}\frac{h_{LEAD} - h_{CAMERA}}{d_{LEAD}} + h_{CAMERA}$$

wherein $d_{LEAD}$ is a lead distance from the moving obstruction measured as the autonomous vehicle approaches the moving obstruction, $d_{TCD}$ is a distance from the autonomous vehicle to the traffic control device, $h_{LEAD}$ is a height of the moving obstruction, $h_{TCD}$ is the height of the traffic control device, and $h_{CAMERA}$ is a height of the one or more cameras;
in response to determining the autonomous vehicle is within the predefined distance from the traffic control device, monitoring, by the one or more controllers, image data collected from the one or more cameras to determine a status of the traffic control device;
continuing to monitor the image data until a line-of-sight between the one or more cameras and the traffic control device is occluded by the moving obstruction;
in response to determining the line-of-sight between the one or more cameras and the traffic control device is occluded, calculating a target following distance between the autonomous vehicle and the moving obstruction; and
instructing the autonomous vehicle to execute one or more preemptive maneuvers to position the autonomous vehicle at the target following distance from the moving obstruction.

11. The method of claim 10, wherein the method further comprises determining the target following distance by:

$$d_{follow} = d_{TCD}\frac{h_{LEAD} - h_{CAMERA}}{h_{TCD} - h_{CAMERA}}$$

wherein $d_{follow}$ is the target following distance.

12. The method of claim 10, wherein the method further comprises:
comparing the target following distance with a threshold distance; and
in response to determining the target following distance is less than the threshold distance, instructing the autonomous vehicle to execute one or more preemptive maneuvers.

13. A preemptive maneuvering system for viewing a status of a traffic control device by one or more cameras of an autonomous vehicle, wherein a moving obstruction is in front of the autonomous vehicle, the preemptive maneuvering system comprising:
one or more controllers executing instructions to:
monitor a current position of the autonomous vehicle until the autonomous vehicle is within a predefined distance from the traffic control device;
in response to determining the autonomous vehicle is within the predefined distance from the traffic control device and the traffic control device is occluded by the moving obstruction, calculate a height of the traffic control device by monitoring image data collected from the one or more cameras before the traffic control device was occluded by the moving obstruction to determine the status of the traffic control device, wherein the height of the traffic control device is determined by:

$$h_{TCD} = d_{TCD}\frac{h_{LEAD} - h_{CAMERA}}{d_{LEAD}} + h_{CAMERA}$$

wherein $d_{LEAD}$ is a lead distance from the moving obstruction measured as the autonomous vehicle approaches the moving obstruction, $d_{TCD}$ is a distance from the autonomous vehicle to the traffic control device, $h_{LEAD}$ is a height of the moving obstruction, $h_{TCD}$ is the height of the traffic control device, and $h_{CAMERA}$ is a height of the one or more cameras;

continue to monitor the image data until a line-of-sight between the one or more cameras and the traffic control device is occluded by the moving obstruction;

in response to determining the line-of-sight between the one or more cameras and the traffic control device is occluded, calculate a target following distance between the autonomous vehicle and the moving obstruction; and instruct the autonomous vehicle to execute one or more preemptive maneuvers to position the autonomous vehicle at the target following distance from the moving obstruction, wherein positioning the autonomous vehicle at the target following distance results in unblocking the line-of-sight between the one or more cameras and the traffic control device.

14. The preemptive maneuvering system of claim 13, wherein the target following distance is determined by:

$$d_{follow} = d_{TCD}\frac{h_{LEAD} - h_{CAMERA}}{h_{TCD} - h_{CAMERA}}$$

wherein $d_{follow}$ is the target following distance.

15. The preemptive maneuvering system of claim 13, wherein the status of the traffic control device indicates when the autonomous vehicle should go, slow down, and stop.

16. The preemptive maneuvering system of claim 13, wherein one or more preemptive maneuvers include at least one of the following: slow-down motion and slow-start motion.

17. The preemptive maneuvering system of claim 13, wherein the one or more controllers execute instructions to:

compare the target following distance with a threshold distance; and in response to determining the target following distance is less than the threshold distance, instruct the autonomous vehicle to execute one or more preemptive maneuvers.

18. The preemptive maneuvering system of claim 17, wherein the threshold distance represents a maximum distance allowed between the autonomous vehicle and the moving obstruction without impeding traffic.

* * * * *